(12) United States Patent
Wright et al.

(10) Patent No.: US 11,081,909 B2
(45) Date of Patent: Aug. 3, 2021

(54) MULTI-MODE WIRELESS CHARGING SYSTEM

(71) Applicant: PowerSphyr Inc., Danville, CA (US)

(72) Inventors: William B. Wright, Boca Raton, FL (US); Ron-Chi Kuo, Concord, CA (US)

(73) Assignee: PowerSphyr Inc., Danville, CA (US)

( * ) Notice: Subject to any disclaimer, the term of this patent is extended or adjusted under 35 U.S.C. 154(b) by 0 days.

(21) Appl. No.: 16/670,999

(22) Filed: Oct. 31, 2019

(65) Prior Publication Data

US 2020/0144870 A1 May 7, 2020

Related U.S. Application Data

(60) Provisional application No. 62/756,514, filed on Nov. 6, 2018.

(51) Int. Cl.
*H02J 50/80* (2016.01)
*H02J 3/02* (2006.01)
*H02J 50/40* (2016.01)
*H02J 50/12* (2016.01)

(52) U.S. Cl.
CPC .............. *H02J 50/80* (2016.02); *H02J 3/02* (2013.01); *H02J 50/12* (2016.02); *H02J 50/40* (2016.02)

(58) Field of Classification Search
CPC .. H02J 50/40; H02J 50/12; H02J 50/10; H02J 7/025; H02J 50/005; H01F 38/14; H04B 5/0037; H04B 5/0081
See application file for complete search history.

(56) References Cited

U.S. PATENT DOCUMENTS

| | | | |
|---|---|---|---|
| 2017/0054213 A1* | 2/2017 | Singh | H04B 5/0081 |
| 2018/0294681 A1* | 10/2018 | Bae | H02J 50/90 |
| 2020/0076242 A1* | 3/2020 | Narayana Bhat | H02J 50/90 |

* cited by examiner

*Primary Examiner* — Ryan Johnson
(74) *Attorney, Agent, or Firm* — Knobbe, Martens, Olson & Bear, LLP

(57) ABSTRACT

A power transfer system for providing charging power to a power receiver is disclosed. The system comprises a hardware controller circuit, a first filter circuit, and a second filter circuit. The hardware controller circuit is configured to determine a first frequency for providing power from a first power transmitter to the power receiver via a first wireless field. The first filter circuit is operationally coupled to the hardware controller circuit and has a first frequency bandpass configured to pass a first driver signal for generating the first wireless field at the first frequency. The second filter circuit is operationally coupled to the hardware controller circuit and has a second frequency bandpass configured to pass a second driver signal for generating a second wireless field at a second frequency that is different from the first frequency.

16 Claims, 7 Drawing Sheets

MULTI-MODE WIRELESS CHARGING SYSTEM

CROSS-REFERENCE TO RELATED APPLICATIONS

The present application claims priority benefit to Provisional Application No. 62/756,514 entitled "MULTI-MODE WIRELESS CHARGING SYSTEM" filed Nov. 6, 2018, the disclosure of which is hereby expressly incorporated in its entirety by reference herein for all purposes.

BACKGROUND

Field of the Disclosure

The present disclosure relates to providing wireless power to electric or electronic devices and more particularly to improving the wireless transfer of power to devices for charging and/or sustaining power to those device loads.

Description of the Related Art

Common electric or electronic devices consume significant levels of electric power with use and a considerable amount of usage occurs while away from main alternate current (AC) power sources traditionally used to supply power to such devices. Due to battery storage limitations, the need for frequent recharging exists in order to sustain device operation. Furthermore, the prevalence of portable electronic devices and devices operating in areas where immediate physical connection with a traditional power source is unavailable has resulted in increased complexity for management and maintenance of connected electrical power adapters and traditional power sources dependent on power conducting cables. Instead, power may be wirelessly transmitted to charge or power devices.

In general, a power transmitting unit (PTU) wirelessly transmits power to a power receiving unit (PRU) via a wireless transmission (for example, a wireless field) generated by the PTU. In some embodiments, a system may include one or more PTUs transmitting power to one or more PRUs. Different PTUs of the system may operate in one or more different modes, where each mode may correspond to power transmission at a different frequency from other modes. Selection between and/or operation in particular modes may be determined based on the one or more PRUs being charged or powered by the PTUs.

SUMMARY

Various implementations of systems, methods, and devices within the scope of the appending claims each have several aspects, no single one of which is solely responsible for the desirable attributes described herein. Without limiting the scope of the appending claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a power transfer system for providing charging power to a power receiver is disclosed. The system comprises a hardware controller circuit, a first filter circuit, and a second filter circuit. The hardware controller circuit is configured to determine a first frequency for providing power from a first power transmitter to the power receiver via a first wireless field. The first filter circuit is operationally coupled to the hardware controller circuit and has a first frequency bandpass configured to pass a first driver signal for generating the first wireless field at the first frequency. The second filter circuit is operationally coupled to the hardware controller circuit and has a second frequency bandpass configured to pass a second driver signal for generating a second wireless field at a second frequency that is different from the first frequency.

Another aspect of the disclosure provides a method of providing charging power to a power receiver. The method comprises determining a first frequency for providing power from a first power transmitter to the power receiver via a first wireless field. The method also comprises passing a first signal having the first frequency via a first filter circuit, the first signal for generating the first wireless field at the first frequency. The method further comprises passing a second signal having a second frequency different from the first frequency via a second filter circuit, the second signal for generating a second wireless field at the second frequency.

Another aspect of the disclosure provides a power transfer system for providing charging power to a power receiver. The system comprises means for determining a first frequency for providing power from a first power transmitter to the power receiver via a first wireless field. The system also comprises means for passing a first signal having the first frequency, the first signal for generating the first wireless field at the first frequency. The system further comprises means for passing a second signal having a second frequency different from the first frequency, the second signal for generating a second wireless field at the second frequency.

DETAILED DESCRIPTION

Figure 1:
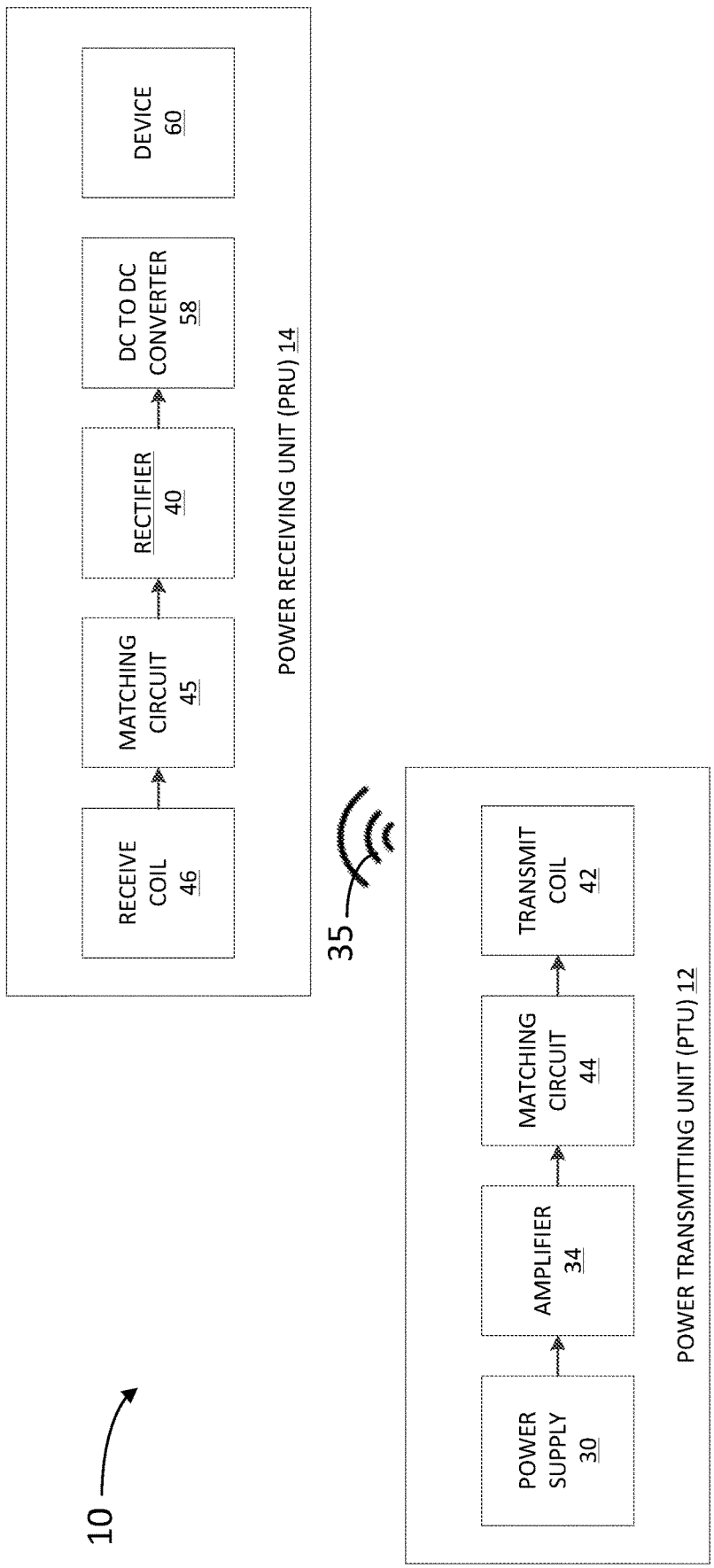
FIG. 1 is a functional block diagram of a system for providing wireless power to a device load, including a power transmitting unit (PTU) and a power receiving unit (PRU), according to some embodiments.

In mobile electronic appliances, power management is an issue that has direct impact in the performance and market advantage for the device. Thus, in many applications it is desirable to have extra mobility and autonomy for users as provided by embodiments disclosed herein. For example, in the area of medical devices such as implanted pacemakers and the like, having autonomy from battery recharge is desired as much as technologically feasible. Indeed, battery replacement in such configurations may involve complicated medical or even surgical procedures. To the extent that these procedures can be avoided, or made more infrequent, embodiments as disclosed herein provide an extended power lifetime of the battery of such devices.

In the field of automotive applications, some embodiments as disclosed herein provide a central power transmitting unit that can wirelessly access multiple mobile devices (e.g., cell phones, laptops, notepads, and the like) within the enclosure of a car by maximizing the charge points throughout the vehicle. Accordingly, in embodiments as disclosed herein a driver can focus on the road rather than in looking for a plug to connect a power cord for a device, thereby enhancing road safety and the convenience of multiple charging points.

In one aspect, the present disclosure is embodied as a system and method of providing wireless power to a device load. Accordingly, embodiments consistent with the present disclosure transmit a directed power signal wirelessly from a power transmitting unit (PTU) to a power receiving unit (PRU) in a first mode of operation (for example, at a first frequency) and in a second mode of operation (for example, at a second frequency). In other aspects, embodiments as disclosed herein include the PTU generating wireless fields (e.g., magnetic fields) having one or more different parameters in the different modes of operation, where different antenna structures of the PTU operate at or in the different modes and generate the wireless fields with the different parameters. For example, a first antenna structure may operate in the first mode and a second antenna structure may operate in the second mode. PRUs having different operating frequencies may couple to the different wireless fields having different frequencies to receive power from the PTU. Accordingly, in embodiments consistent with the present disclosure, power transfer from the PTU to the PRUs can be managed selectively and efficiently. Embodiments as disclosed herein deliver power as desired in one of the first mode of operation, the second mode of operation, or a combination of both modes simultaneously. Furthermore, embodiments as disclosed herein take into consideration power requirements and/or operating frequency(ies) of the PRU(s). In some embodiments, the PTU may transfer power to an individual PRU of a plurality of PRUs. In some embodiments, the transfer from the PTU to the plurality of PRUs is sorted or coordinated according to a prioritization that takes into account the power requirements and operating frequency(ies) of each PRU relative to the PTU.

In some embodiments, the PTU includes one coil configured to operate at one frequency in one mode and another coil configured to operate at another frequency in another mode. The PRU may include a receive coil configured to inductively couple to a magnetic field at one frequency in one mode and include another receive coil configured to inductively capture a resonant magnetic field in the near field generated by the transmit coil in another mode. In some embodiments, multiple PRUs may each include one or more receive coils configured to inductively couple to one or more wireless fields based on the disclosure herein.

Some embodiments include a method of managing multimode transfer of wireless power. The method includes optimizing the wireless transfer of power from the PTU in at least the first mode of operation, the second mode of operation, or the two modes of operation simultaneously. The method includes capturing the optimized power transferred wirelessly over distance by one or more PRUs.

In some embodiments, as introduced above, the two modes of operation may involve transmitting wireless transmissions with different parameters from one another (i.e., generating the wireless transmissions with one or more different parameters, for example in different protocols, with different power levels, with different frequencies, and so forth). For example, the first mode involves transmitting wireless power (for example, inductively) by a first transmission coil at a first frequency while the second mode involves transmitting wireless power (for example, inductively) by a second transmission coil (different from the first transmission coil) at a second frequency (different from the first frequency). With the first and second transmission coils of the PTU operating in the different modes, the first coil may create interference or draw power when the PTU is operating in the second mode and the second coil may create interference or draw power when the PTU is operating in the first mode. Further explanation is provided below.

The present disclosure addresses the shortcomings of existing single- or multi-mode wireless power delivery systems, for example interference created by one or more coils when exposed to wireless transmissions from other coils. At the same time, embodiments consistent with the present disclosure obviate a need for traditional wired or cabled power delivery methods. Advantages of the present disclosure include increased efficiency, compatibility with existing standards, added redundancy and optional spatial versatility. Details of the wireless power system described above are provided below with respect to FIGS. 1-7.

FIG. 1 is a functional block diagram of a system 10 for transferring wireless power to a power receiving unit (PRU) 14 from a power transmitting unit (PTU) 12 via a wireless transmission 35, according to some embodiments. As described herein, the wireless transmission 35 may comprise a wireless field 35, though other types of wireless power transfer transmissions (for example, radio frequency signals, and so forth) are envisioned. The PTU 12, as shown, includes a plurality of electric components, including a power supply or source 30, an amplifier circuit 34, a matching circuit 44, and a transmit coil 42. The PRU 14, as shown, includes a receive coil 46, a matching circuit 45, a rectifier circuit 40, a DC/DC converter circuit 58, and a device or load 60. The PTU 12 generates the wireless field 35 (for example, an electromagnetic, electric, radio frequency, or magnetic field) based on power received from the power supply 30 to perform the wireless power transfer to the PRU 14.

The power supply 30 comprises one or more electric components that enables the power supply 30 to generate a power signal. In some embodiments, the power supply 30 receives an external power signal or generates an internal power signal, where the power signal comprises a voltage signal. The power signal from the power supply 30 may be provided to the amplifier circuit 34.

The amplifier circuit 34 receives the power signal from the power supply 30. The amplifier circuit 34 comprises one or more electric components that otherwise rectify, amplify, and/or adjust the power signal from the power supply 30 to drive the transmit coil 42 to generate the wireless field 35. Based on the received power signal, the amplifier circuit 34 drives the transmit coil 42 at a resonant frequency of the transmit coil 42 (or other selectable frequency) based on the power signal from the power supply 30. In some embodiments, the amplifier 34 includes one or more of a driver circuit or an oscillator (not shown). The amplified power signal is output to the matching circuit 44.

The matching circuit 44 receives the amplified power signal from the amplifier circuit 34. The matching circuit 44 comprises one or more electric components that matches an impedance of the PTU 12 (excluding the transmit coil 42, for example as observed at the amplifier circuit 34 and/or a filter circuit upstream of the matching circuit 44) to the transmit coil 42. In some embodiments, the matching circuit 44 may include one or more filtering components that filter out harmonics or other unwanted frequencies from the amplified power signal received from the amplifier circuit 34. In some embodiments, the matching circuit 44 may be separate from a filter circuit (not shown in this figure) that filters out the harmonics or otherwise unwanted frequencies. In some embodiments, the filter circuit receives and filters analog current and voltage signals (for example, as received from the amplifier circuit 34) and/or alters one or more of a phase of the signals. In some embodiments, the filter circuit comprises a bandpass or similar circuitry that attenuates one or more frequencies while permitting one or more other frequencies to pass. The matching circuit 44 generates a matched power signal that is output to the transmit coil 42.

The transmit coil 42 receives the matched power signal from the matching circuit 44. The transmit coil 42 comprises an antenna, a coil, or any other resonator or inductor that generates the wireless field 35 in response to the matched power signal. The transmit coil 42 generates the wireless field 35 to wireless output power at a level sufficient for charging or powering a load or device within a charging space. Specifically, the transmit coil 42 generates the wireless field 35 to wirelessly transmit power, based on the matched power signal, to the PRU 14 located within the charging space, at a power level sufficient to charge or power the device 60.

The wireless field 35, as described above, may be one of a magnetic and/or electromagnetic field that wirelessly conveys energy in a near field (or a non-radiative) region around the transmit coil 42.

The receive coil 46 comprises another antenna, coil, or other resonator or inductor that, when exposed to the wireless field 35, resonates at a frequency similar to that at which the transmit coil 42 resonates when generating the wireless field 35. The receive coil 46 couples to the wireless field 35 generated by the transmit coil 42 and, in response to the wireless field 35, an alternating current (AC) signal is induced in the receive coil 46. The receive coil 46 provides the AC signal to the matching circuit 45.

The matching circuit 45 receives the AC signal from the receive coil 46. Similar to the matching circuit 44, the matching circuit 45 comprises one or more electric components that matches an impedance of the receive coil 46 to the PRU 14 (excluding the receive coil 46, for example as observed at the rectifier circuit 40 and/or a filter circuit downstream of the matching circuit 45). In some embodiments, the matching circuit 45 may include one or more filtering components that filter out harmonics or other unwanted frequencies from the AC signal received from the receive coil 46. In some embodiments, the matching circuit 45 may be separate from a filter circuit (not shown in this figure) that filters out the harmonics or otherwise unwanted frequencies. In some embodiments, the filter circuit receives and filters analog current and voltage signals from the AC signal and/or alters one or a phase of the AC signal. In some embodiments, the filter circuit comprises a bandpass filter or similar circuitry that attenuates one or more frequencies while permitting one or more other frequencies to pass. The matching circuit 45 thus generates a matched power signal that is output to the rectifier 40.

The rectifier circuit 40 receives the matched power signal from the matching circuit 45. The rectifier circuit 40 comprises one or more electric components that convert power from matched power signal received from the matching circuit 45. For example, the rectifier circuit 40 comprises one or more AC/DC converters, such as a half-wave and/or full wave rectifiers, bridges, and so forth. The rectifier circuit 40 generates a direct current (DC) signal based on the matched power signal and outputs the DC signal to the DC/DC converter circuit 58. In some embodiments, the matching circuit 45 and the rectifier circuit 40 may be combined to allow the combined circuit to match the impedance of the receive coil 46 to the PRU 14 (excluding the receive coil 46).

The DC/DC converter circuit 58 receives the DC signal from the rectifier circuit 40. The DC/DC converter circuit 58 amplifies or otherwise adjusts to an appropriate level the DC signal from rectifier circuit 40 for conveyance to power or charge the device 60. The DC/DC converter circuit 58 may convert the DC signal from the rectifier circuit 40 into an energy signal that is compatible with the device 60.

The device 60 receives the DC signal from the DC/DC converter circuit 58. The device 60 comprises any (integrated within or external to the PRU 14) device or load that is charged or powered by power transmitted wirelessly via the wireless field 35.

In some embodiments, the transmit coil 42 of the PTU 12 may be exposed to another wireless field generated by another transmit coil and generate an induced current in response to the other wireless field. Additionally, in some embodiments, one or more of the PTU 12 and/or the PRU 14 is configured to operate in multiple modes. For example, the PTU 12 includes multiple transmit coils 42 and corresponding circuitry (for example, the amplifier 34 and/or the matching network 44) that operate at different frequencies to generate wireless fields 35 at different frequencies or with one or more other different parameters from each other. Similarly, the PRU 14 may include multiple receive coils 46 that operate at different frequencies or other parameters from each other with corresponding circuitry or the PRU 14 may comprise a plurality of PRUs 14. Each frequency may correspond to a different operation mode, such that the PTU 12 may generate the wireless field 35 to transmit wireless power in a first mode of operation to the PRU 14 or in a second mode of operation to the PRU 14 or another PRU 14. In some embodiments, each different mode may comprise operating at one or more different frequencies, different amplitudes, etc. For example, the transmit coil 42 is configured to generate the wireless field 35 in a first mode at a frequency of approximately 6.78 MHz while in a second mode the transmit coils may generate the wireless field 35 at a lower frequency, for example 1 MHz, 100's of kHz, or even lower frequencies, or higher frequencies, depending on range, power, and other design configurations.

In one embodiment, one or both of the PTU 12 and the PRU 14 includes a controller circuit operatively connected to one or more of the other electric components of the PTU 12 and/or the PRU 14. The controller circuit of the PTU 12 may be part of the power supply 30 or may be separate from the power supply. The controller circuit may control the PTU 12 to induce wireless transfer of power within the near field as required (for example, based on detection of the PRU 14 or receipt of an input or a command), and to manage the distribution and priorities of power transfer. When in the PRU 14, the controller circuit may control the PRU 14 to provide power, for example induced power, to the device 60, and to manage the distribution and priorities of charge management. Furthermore, the controller circuit in the PRU 14 manages and determines the power requirement of PRU 14 and the priority value for transferring power to PRU 14 in view of the range configuration between PTU 12 and PRU 14. A communications circuit in one or both of the PTU 12 and the PRU 14 (not shown in this figure) may establish a communication link (for example, Bluetooth, Wi-Fi, NFC and so forth) between the PTU 12 and the PRU 14.

In some embodiments, though not shown in FIG. 1, PTU 12 may be wired to the power supply 30 that is external to the PTU 12 (e.g., a computer, a centralized service station, a wall power, and the like) and configured to receive power resources. Accordingly, a USB-Socket or similar connector may connect PTU 12 with the external power supply.

In some embodiments, one or more of the PTU 12 and the PRU 14 includes a memory circuit (not shown). The memory circuit may include instructions to cause the respective controller circuit to perform one or more functions.

Thus, the PTU 12 described herein may transfer power wirelessly in one or more different modes (for example, at one or more different frequencies) to the PRU 14 to provide power to charge and/or power a load coupled to or part of the PRU 14, for example the device 60. Further details of the PTU 12 providing wireless power to a plurality of PRUs 14 are provided below with reference to FIGS. 2-4.

Figure 2:
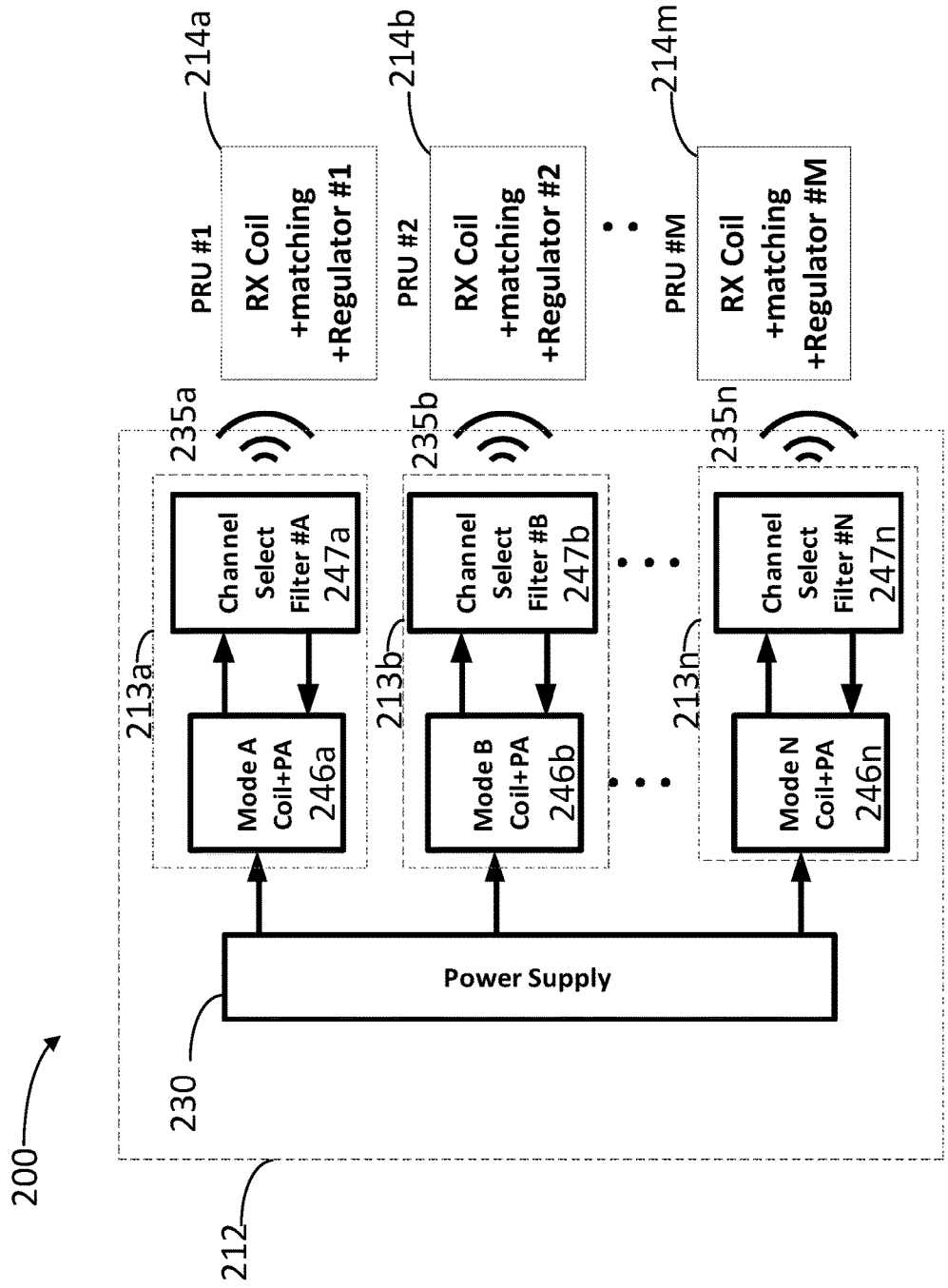
FIG. 2 is a functional block diagram of a multi-mode system for providing wireless power from a PTU to a plurality of PRUs, according to some embodiments.

FIG. 2 is a functional block diagram of a multi-mode system 200 for providing wireless power from a PTU 212 to a plurality of PRUs 214, according to some embodiments. The system 200 may correspond to the system 100 of FIG. 1, where the PTU 212 corresponds to the PTU 12 and the PRUs 214 correspond to the PRU 14. The PTU 212 includes a power supply 230 that provides power to each of one or more transmit coil circuits 213a-213n, where n represents a number of transmit coil circuits 213 greater than 1. Each of the one or more transmit coil circuits 213a-213n includes a coil and power amplifier circuit 246 and a channel select filter circuit 247. The power amplifier circuit of the coil and power amplifier circuit 246 may correspond to one or more of the amplifier 34 and the matching network 44. In some embodiments, the coil and power amplifier circuit 246 includes a transmit coil, resonator or antenna, for example the transmit coil 42. The channel select filter 247 may comprise one or more filtering components that filter signals transmitted by the coil and power amplifier circuit 246, for example the matching circuit 44. In some embodiments, the channel select filter 247 may be combined with the matching circuit 44 if the matching circuit is designed to show different impedance values at different frequencies. Additionally, or alternatively, the channel select filter 247 may comprise one or more electric components that may allow or disable signal or current flow (either induced or driven) through the channel select filter 247 and/or the transmit coil circuits 213a-213n. Further details regarding the channel select filter 247 will be provided below. The various electric components of the multi-mode power transfer system 200 may be integrated onto a single printed circuit board ("PCB"), not shown in FIG. 2.

Each of the transmit coil circuits 213a-213n may generate a wireless field or signal to transfer power wirelessly to corresponding PRUs 214 in response to a drive signal. For example, each of the transmit coil circuits 213a-213n corresponds to a particular channel or mode of operation. In some embodiments, the PTU 212 comprises one or more driver circuits (not shown in this figure) to generate the drive signal. For example, the PTU 212 comprises an individual or independent driver circuit for each transmit coil circuit 213. In some embodiments, the PTU 212 comprises a single driver circuit for all of the transmit coil circuits 213. When the PTU 212 comprises the single driver circuit, the channel select filter 247 of the transmit coil circuits 213 may prevent or inhibit one of the transmit coil circuits 213 from generating the corresponding wireless field 235 when the frequency of the drive signal is outside the bandpass filter of the respective channel select filter 247. As such, when there is only the single driver circuit, the PTU 212 may be unable to generate the wireless fields 235 at different frequencies concurrently. However, when there are multiple independent driver circuits, the PTU 212 may be able to generate the wireless fields 235 at different frequencies concurrently.

The transmit coil circuit 213a generates a wireless field 235a (for example, corresponding to the wireless field 35 of FIG. 1) with a first set of parameters to transmit the power to the PRU 214a wirelessly. Similarly, the transmit coil circuits 213b-213n generate wireless fields and/or signals to transmit power to the PRUs 214b-214m wirelessly on one or more different channels (for example, the different frequencies). Thus, each of the transmit coil circuits 213a-213n may be configured to wirelessly transmit power in one or more different modes. Each of the transmit circuits 213a-213n may thus generate a respective wireless field 235a-235n to convey power wirelessly to the respective PRU 214a-214m.

The PRUs 214a-214m may couple to the wireless fields 235a-235n and may each comprise a receive coil, a matching circuit, and a regulator circuit. For example, the receive coil comprises one or more receive coils 46 of FIG. 1. The matching circuit of the PRU 214 may comprise the matching circuit 45 of FIG. 1. The PRUs 214a-214m each may be configured to wirelessly receive power in one or more different modes (for example, at one or more different frequencies). For example, different manufacturers may manufacture the PRUs 214a-214m to operate with different parameters, for example in different protocols, with different power levels, with different frequencies from one another from one another, and so forth.

In some embodiments, the different parameters, for example in different protocols, different power levels, different frequencies, and so forth defined by standards bodies or organizations that regulate wireless power transfer between devices. The multi-mode power transfer system 200 described herein may provide compatibility across a variety of the different protocols, different power levels, different frequencies, and so forth. In some embodiments, the different protocols, different power levels, different frequencies, and so forth may be provided by different electric components or circuits, for example the transmit coil circuits 213a-213n. For example, each different transmit coil circuits 213a-213n transmits power according to a different protocol, different power level, different frequency, and so forth. Accordingly, the PTU 212 may use the different transfer coil circuits 213a-213n to transfer power wirelessly according to the different parameters, standards, power levels, frequencies, and so forth. Thus, with the system 200 of FIG. 2, the single PTU 212 may transmit wireless power to the different PRUs 214a-214m (for example, from different manufacturers) meeting different transmission requirements more efficiently without using multiple PTUs 212.

However, as introduced above, since each of the transfer coil circuits 213a-213n may generate induced currents when exposed to wireless fields 235a-235n generated by another transmit coil, the various transmit coils may interfere with and/or draw power from one another. For example, when the transmit coil circuit 213a generates the wireless field 235a at frequency A, the second transmit coil circuit 213*b* configured to generate the second wireless field 235*b* at frequency B may instead couple to the wireless field 235*a* (for example, cross-couple or cross-talk). This cross-coupling or cross-talking between transmit coil circuits 213 of the PTU 212 may thus introduce "interference" and reduce efficiencies. In some embodiments, the interference or cross-coupling may exist particularly for PTUs 212 having collocated transmit coil circuits 213. Various embodiments described herein avoid such cross-coupling and/or interference and maximize efficiency of wireless power transfer, as described further herein.

As described above, when the PTU 212 is configured to wirelessly transfer power, transfer in one particular mode (for example by the transfer coil circuit 213*a* at frequency A, etc.) may create or result in interference and/or an induced current in the transfer coil circuit 213*b* configured to operate in another particular mode (for example, at frequency B). Therefore, the transfer coil circuit 213*b* may act as a silent PRU (for example, operate as a load) to wireless power transfer by the transfer coil circuit 213*a* and cause interference to the wireless power transfer.

This interference between multiple different circuits and/or channels may limit designs of the power transfer system 200 to independent coil systems or separately activated mechanisms. However, independent coil systems or separately activated mechanisms for the different circuits and/or channels are not always optimal. For example, introducing the separately activated mechanisms into the power transfer system 200 (for example, into each of the transfer coil circuits 213) increases complexity of control methods of the power transfer system 200, increases manufacturing costs, consumes more power during operation, and/or generates more heat during operation. Additionally, such independent coil systems may occupy more space, increasing the size in the power transfer system 200.

In some embodiments, the PTU 212 may simultaneously transfer power to multiple of the PRUs 214*a*-214*m* at the different power requirements. In some embodiments, the PTU 212 transfers power to multiple PRUs 214*a*-214*m* at different times and at different power requirements. Additionally, the PTU 212 may attain freedom of positioning of the PRUs 214*a*-214*m* based on the wireless transfer of power. Additionally, as will be described below in further detail, the channel select filter 247 in each of the transfer coil circuits 213 may selectively activate or selectively prevent each corresponding coil and amplifier circuit 246 from acting as a load on the wireless field 235 generated by another of the transfer coil circuits 213, thereby eliminating interference between different modes. Further details regarding such selective activation and deactivation of the transfer coil circuits 213 is provided below with reference to FIG. 3. Further details regarding individual circuit components of the transfer coil circuits 213 are provided below with reference to FIG. 4.

Figure 3:
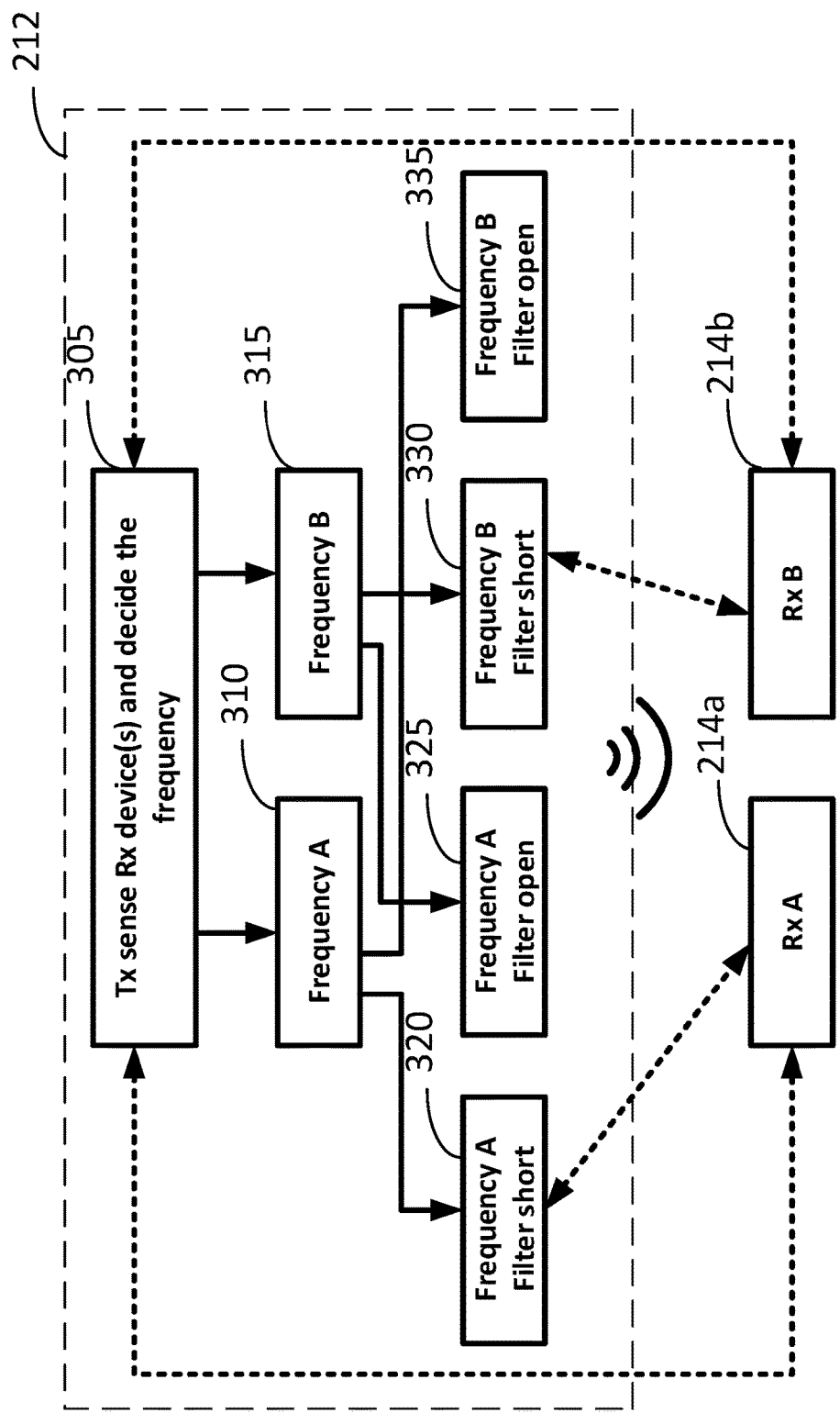
FIG. 3 is a flow block diagram illustrating various frequency selection and filter control steps for a method of transferring power wirelessly in the multi-mode system of FIG. 2, according to some embodiments.

FIG. 3 is a flow block diagram illustrating various frequency selection and filter control steps for a method of transferring power wirelessly from the PTU 212 to the PTUs 214*a* and 214*b* of FIG. 2, according to some embodiments. FIG. 3 shows three devices involved in the steps of the method: the PTU 212 and two, PRUs 214*a* and 214*b*. Additional or fewer PRUs 214 may be involved in the steps of the method. One or more steps of the method may be performed by one or more electric components of the PTU 212, such as the controller (not shown in FIG. 3). Though not explicitly shown in FIG. 3, the PTU 212 includes a power supply and a frequency A transmit coil circuit comprising a frequency A filter circuit/component and a coil (i.e., transfer coil circuit 213*a*) and a frequency B transmit coil circuit comprising a frequency B filter circuit/component and a coil (i.e., transfer coil circuit 213*b*). As described above, the frequency A transmit coil circuit may transfer power to the PRU 214*a* at the frequency A and the frequency B transmit coil circuit may transfer power to the PRU 214*b* at the frequency B. In some embodiments, the PRU 214*a* receives power only at the frequency A and the PRU 214*b* receives power only at the frequency B.

At block 305, the controller circuit of the PTU 212 may wirelessly sense or communicate with the controller of one or more PRUs 214*a*-214*b*. As part of the sensing or communicating, the controller circuit of the PTU 212 may determine and/or identify one or more modes (for example, frequencies) in which the PRUs 214*a*-214*b* are expecting or configured to receive wireless power from the PTU 212. For example, the controller circuit of the PTU 212 may determine, from the sensing or communicating, that the PRU 214*a* is configured to receive power at frequency A and that the PRU 214*b* is configured to receive power at frequency B. From block 305, the method proceeds to block 310, where the PTU 212 allows wireless power transmission at frequency A via the frequency A transmit coil circuit, based on the determination at block 305. When the PTU 212 determines to transmit power via the frequency A transmit coil circuit at the frequency A, the PTU 212 may generate a drive current at the frequency A. The drive current at the frequency A may cause the frequency A filter of the frequency A transmit coil circuit to be shorted (for example, enter a short circuited or similar state or mode) at block 320. The drive current at the frequency A may also cause the frequency B filter of the frequency B transmit coil circuit to be opened (for example, enter an opened circuit or similar state or mode) at block 335.

In some embodiments, when the PTU 212 determines to transmit power at the frequency A, the frequency A filter is shorted at block 320 by actuating a switch or other mechanical means or by generating a signal (i.e., the drive current) with a frequency or other signal characteristic (for example, the frequency A) that causes the frequency A filter to operate as if in the short circuit state or mode. For example, the frequency A filter operates in a bandpass or similar mode and, thus, the frequency A filter allows the drive current at the frequency A to pass, thereby allowing wireless power transmission at the frequency A via the frequency A coil.

As introduced above, when the PTU 212 determines to transmit power at the frequency A, the frequency B filter may be opened at block 335 by actuating a switch, which may be electrical (for example, a transistor, etc.) or mechanical. Alternatively, or additionally, the frequency B filter may be opened at block 335 because a signal causes the frequency B filter to operate as if in an open circuit state. For example, the wireless power transmission at the frequency A induces a current having a frequency A in the frequency B transmit coil circuit when the frequency B transmit coil circuit is exposed to the wireless field 235*a*. The induced current having the frequency A may cause the frequency B filter to operate in the open circuit state or mode. The open circuit occurs because the frequency A of the induced current may be outside a bandpass range of the frequency B filter, thereby causing the frequency B filter to effectively act as an open circuit in response to the induced current having frequency A. Alternatively, or additionally, the wireless power transmission with the drive current at the frequency A may cause the frequency B filter to operate in the open circuit state or mode. This may prevent the frequency B transmit coil circuit from transmitting the wireless power at the frequency A and/or receiving or drawing power at the frequency A. In some embodiments, the bandpass frequency (ies) of the frequency B filter do(es) not overlap with the bandpass frequency(ies) of the frequency A filter. Because the frequency A and B filters do not have overlapping bandpass frequencies, the two filters will never both allow any single signal to pass both filters.

By short circuiting the frequency A filter, the PTU 212 may transmit power wirelessly to the PRU 214*a* (for example via the wireless field or signal described above) based on or using the frequency A. By open circuiting the frequency B filter, the PTU 212 may place corresponding frequency B components (for example, the mode B coil and power amplifier circuit 246 and the mode B channel select filter circuit 247) in the open circuit state or mode. When in the open state or mode, the frequency B components may not interfere with or draw power from the frequency A wireless field. Accordingly, the frequency A filter at block 320 and the frequency B filter at block 335 may effectively, operate, or be used as switches that can be opened or closed.

Alternatively, or additionally, the PTU 212 allows wireless power transmission at the frequency B via the frequency B transmit coil circuit at block 315, based on the determination at block 305. When the PTU 212 determines to transmit power via the frequency B transmit coil circuit at the frequency B, the PTU 212 may generate the drive current at the frequency B. The drive current at the frequency B may cause the frequency B filter to be shorted (for example, enter a short circuited or similar state or mode) at block 330. The drive current at the frequency B may also cause the frequency A filter to be opened (for example, enter an open circuited or similar state or mode) at block 325.

Similar to the frequency A filter described above, in some embodiments, the frequency B filter is shorted at block 330 by actuating a switch or other mechanical means or by generating a signal (i.e., the drive current) with a frequency or other signal characteristic that causes the frequency B filter to operate as if in a short circuit state or mode. For example, the frequency B filter operates in a bandpass or similar mode when the drive current is at the frequency B. Thus, the frequency B filter allows the drive current at the frequency B to pass, thereby allowing wireless power transmission at the frequency B via the frequency B coil.

The frequency A filter may be opened at block 325 by actuating a switch, which may be electrical (for example, a transistor) or mechanical. Alternatively, or additionally, the frequency A filter may be opened at block 325 by generating a signal with a frequency or other signal characteristic that causes the frequency A filter to operate as if in an open circuit state. For example, the wireless power transmission at the frequency B induces a current having a frequency B in the frequency A transmit coil circuit. The induced current having the frequency B may cause the frequency A filter to operate in the open circuit state or mode. The open circuit occurs because the frequency B of the induced current may be outside a bandpass range of the frequency A filter, thereby causing the frequency A filter to effectively act as an open circuit in response to the induced current having the frequency B. Alternatively, or additionally, the wireless power transmission with the drive current at the frequency B may cause the frequency A filter to operate in the open circuit state or mode. This may prevent the frequency A transmit coil circuit from transmitting the wireless power at the frequency B and/or receiving or drawing power at the frequency A.

By short circuiting the frequency B filter, the PTU 212 may transmit power wirelessly to the PRU 214*b* (for example via the wireless field described above) based on or using the frequency B. By open circuiting the frequency A filter, the PTU 212 may place corresponding frequency A components (for example, the mode A coil and power amplifier circuit 246 and the mode A channel select filter circuit 247) in the opened state or mode. When in the open state or mode, the frequency A components may not interfere with or draw power from the frequency B wireless field. Accordingly, the frequency B filter at block 330 and the frequency A filter at block 325 may effectively operate or be used as switches that can be opened or closed.

Accordingly, with respect to the block flow of FIG. 3, the PTU 212 may convey wireless power to the PRUs 214*a* and 214*b* such that different coil circuits of the PTU 212 that operate in different modes (for example, at different frequencies) do not create interference or mutually couple with each other in view of the filter circuit coupled to the respective coil. This allows the PTU 212 to convey wireless power to PRUs 214 that operate in the different modes (for example, at different frequencies) while maintaining power transfer efficiencies between the PTU 212 and the PRUs 214.

Figure 4:
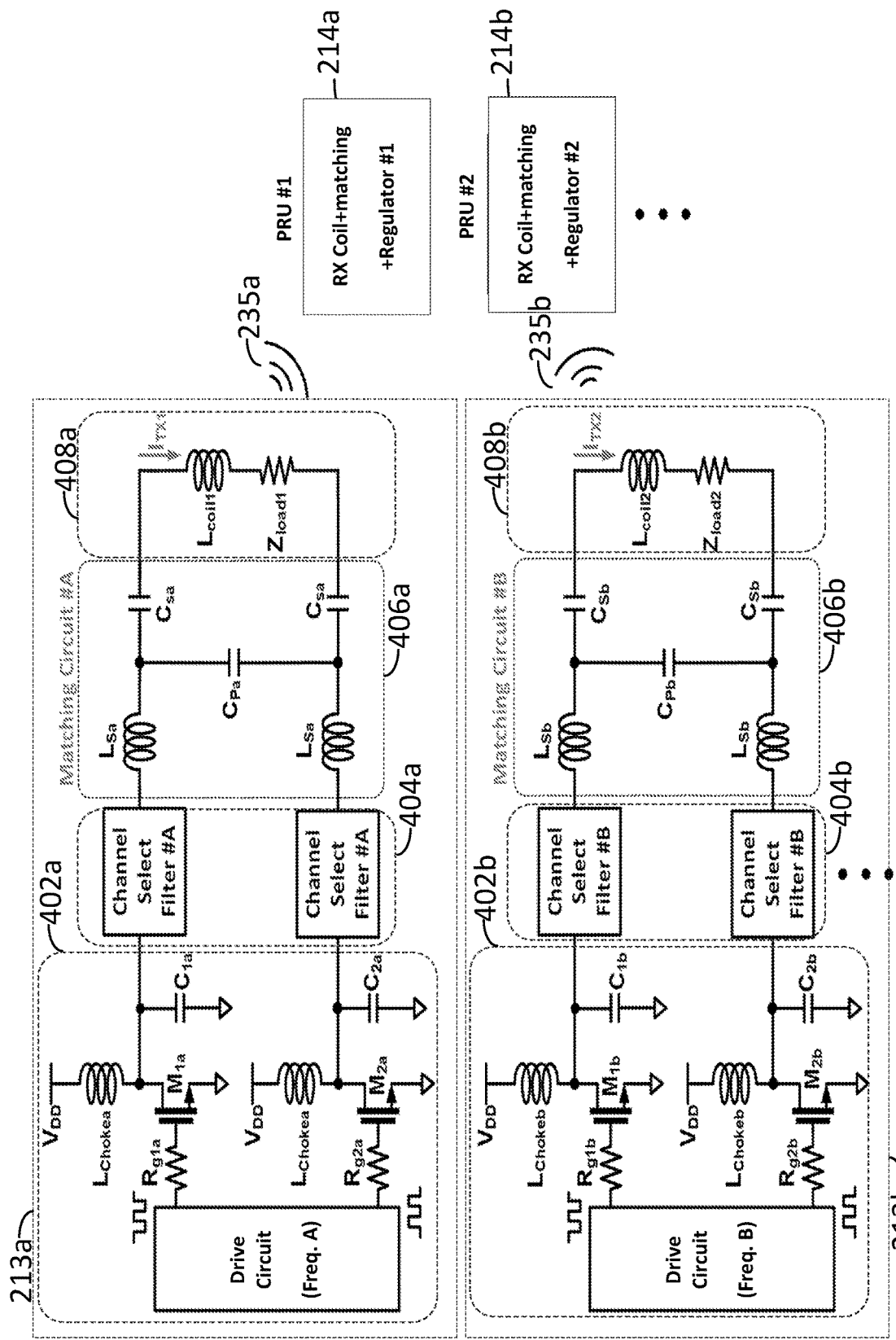
FIG. 4 is a schematic diagram of two transmit coil circuits of the multi-mode system of FIG. 2, according to some embodiments.

As mentioned above, the transmit coil circuits 213 of FIG. 2 include one or more components (for example, a filter) that prevent the transmit coil circuits 213 from interfering with or cross-coupling with each other. FIG. 4 provides further details of the electric components of the transmit coils circuits 213. FIG. 4 is a circuit diagram of two transmit coil circuits 213*a* and 213*b* of the multi-mode system 200 of FIG. 2, according to some embodiments. As shown, the transmit coil circuit 213*a* includes a drive/control circuit 402*a*, a filter circuit 404*a*, a matching circuit 406*a*, and a coil circuit 408*a*. The filter circuit 404*a*, the matching circuit 406*a*, and the coil circuit 408*a* are connected in series. Similarly, the transmit coil circuit 213*b* includes a drive/control circuit 402*b*, a filter circuit 404*b*, a matching circuit 406*b*, and a coil circuit 408*b*. The filter circuit 404*b*, the matching circuit 406*b*, and the coil circuit 408*b* are connected in series. The transmit coil circuit 213*a* may operate with the frequency A while the transmit coil circuit 213*b* may operate with the frequency B, where frequency A is different from frequency B. As also shown in FIG. 4, the transmit coil circuit 213*a* may transmit power, at the frequency A, to the PRU 214*a*, while the transmit coil circuit 213*b* may transmit power, at the frequency B, to the PRU 214*b*. In some embodiments, the transmit coil circuits 213*a* and 213*b* transmit power concurrently or at different times. For example and explanation purposes, circuits 402*a* and 408*a* are equivalents or correspond to 246*a* and 404*a* is equivalent or corresponds to 247*a*.

The drive/control circuit 402*a* may include one or more electric components that control and/or generate a drive current at the frequency A. For example, the drive/control circuit 402*a* may include the power amplifier that generates the drive signal at the frequency A based on which the coil circuit 408*a* generates the wireless field 235*a*. The drive/control circuit 402*a* may receive an input from the controller circuit of the PTU 212. The input received from the controller circuit may activate the drive/control circuit 402*a* to generate the drive signal to drive the coil circuit 408*a* (for example, based on sensing or determining that the PRU 214 is configured to receive wireless power at the corresponding frequency or in the corresponding mode. The drive/control circuit 402*a* may also include one or more electric components or paths that create a closed loop path to ground, such as capacitors $C_{1a}$ and $C_{2a}$. The drive/control circuit 402a may provide the drive current at the frequency A to the filter circuit 404a. In some embodiments, the drive/control circuit 402a includes one or more of the amplifier circuit 34 and the power supply 30 of FIG. 1, as described above.

The filter circuit 404a may filter out harmonics or other unwanted frequencies from the drive current at the frequency A. The filter circuit 404a is shown having two filter blocks in order to selectively drive the coil circuit 408a with the drive current in two directions. In some embodiments, the filter circuit 404a also filters out harmonics or other unwanted frequencies from or in induced currents. For example, the filter circuit 404a is or operates as a bandpass filter that only allows currents having substantially the frequency A to pass. Thus, as described with reference to FIGS. 2 and 3 and corresponding description above, the filter circuit 404a may act as a closed switch and allow only drive currents at the frequency A to pass to cause the coil circuit 408a to resonate at the frequency A and wirelessly transmit power at the frequency A. Additionally, and/or alternatively, the filter circuit 404a may act as an open switch and allow only induced currents at the frequency A to be generated in the coil circuit 408a. Accordingly, when the coil circuit 408a is exposed to a wireless field with a frequency different from frequency A, such as frequency B, the filter circuit 404a may impede the frequency B current from flowing past or through the filter 404a and thus may prevent the transmit coil circuit 213a from acting as a load to the frequency B wireless field. Accordingly, with the circuits shown in FIG. 4, the transmit coil circuit 213a will not absorb power or energy from the frequency B wireless field and the transmit coil circuit 213b will not absorb power or energy from the frequency A wireless field. In some embodiments, the transmit coil 213a will only generate the wireless field 235a when driven by the frequency A drive signal (ignoring drive signals at other frequencies) and will not absorb power or energy from wireless fields 235 with frequencies other than the frequency A. The transmit coil 213b may similarly ignore drive signals and wireless fields of frequencies not frequency B.

In some embodiments, the filter circuit 404a is connected close (for example, directly) to the matching circuit 406a and between the coil circuit 408a and any paths shorted to ground, such as paths between the capacitors $C_{1a}$ and $C_{2a}$. The electric components that form the filter circuit 404a may vary based on implementation. In some embodiments, the filter circuit 404a includes one or more of the amplifier circuit 34 and the matching circuit 44 of FIG. 1.

The matching circuit 406a may match impedance of the coil circuit 408a to one or more other electric components of the transmit coil circuit 213a (for example, the drive/control circuit 402a and/or the filter circuit 404a). The electric components and design of the matching circuit 406a shown in FIG. 4 is exemplary and not limiting. In some embodiments, the matching circuit 406a includes the matching circuit 44 of FIG. 1, as described above.

The coil circuit 408a may comprise a circuit that generates a wireless field or signal based on the drive current to wirelessly output or transmit power at a level sufficient for charging a battery or load that is wirelessly coupled to the coil circuit 408a. In some embodiments, the coil circuit 408a includes the transmit coil 42 of FIG. 1, as described above.

In some embodiments, one or more of the drive/control circuit 402a, the filter circuit 404a, the matching circuit 406a, and the coil circuit 408a may be combined into a single circuit or multiple discrete circuits.

The drive/control circuit 402b, the filter circuit 404b, the matching circuit 406b, and the coil circuit 408b of the transmit coil circuit 213b may operate similarly to the drive/control circuit 402a, the filter circuit 404a, the matching circuit 406a, and the coil circuit 408a of the transmit coil circuit 213a, described above. However, the transmit coil circuit 213b may operate to transmit power at the frequency B as opposed to the frequency A of the transmit coil circuit 213a. Accordingly, the filter circuit 404b may filter out harmonics or other unwanted frequencies from the drive current at the frequency B. In some embodiments, the filter circuit 404b also filters out harmonics or other unwanted frequencies from or in induced currents. For example, the filter circuit 404b is or operates as a bandpass filter that only allows currents having substantially the frequency B to pass. Thus, filter circuit 404b may act as a closed switch and allow only drive currents at the frequency B to pass to cause the coil circuit 408b to resonate at the frequency B and wirelessly transmit power at the frequency B. Additionally, and/or alternatively, the filter circuit 404b may act as an open switch and allow only induced currents at the frequency B to be generated in the coil circuit 408b. Accordingly, when the coil circuit 408b is exposed to a wireless field or signal with a frequency different from frequency B, such as frequency A, the filter circuit 404b may impede the frequency A current from flowing past or through the filter 404b and thus may prevent the transmit coil circuit 213b from acting as a load to the frequency A wireless field or signal.

Accordingly, with the circuits shown in FIG. 4, the PTU 212 may convey wireless power to the PRUs 214a and 214b. Based on the circuitry shown in FIG. 4, the transmit coil circuits 213a and 213b of the PTU 212 (that operate in different modes) may independently wirelessly transmit power to the respective PRUs 214 without creating interference or mutually coupling with each other. This allows the PTU 212 to convey wireless power to PRUs 214 that operate in the different modes (for example, at the different frequencies) while maintaining power transfer efficiencies between the PTU 212 and the PRUs 214. This may also allow the PTU 212 to simultaneously transmit power to the different mode PRUs 214 with improved efficiencies as well as individually.

Figure 5:
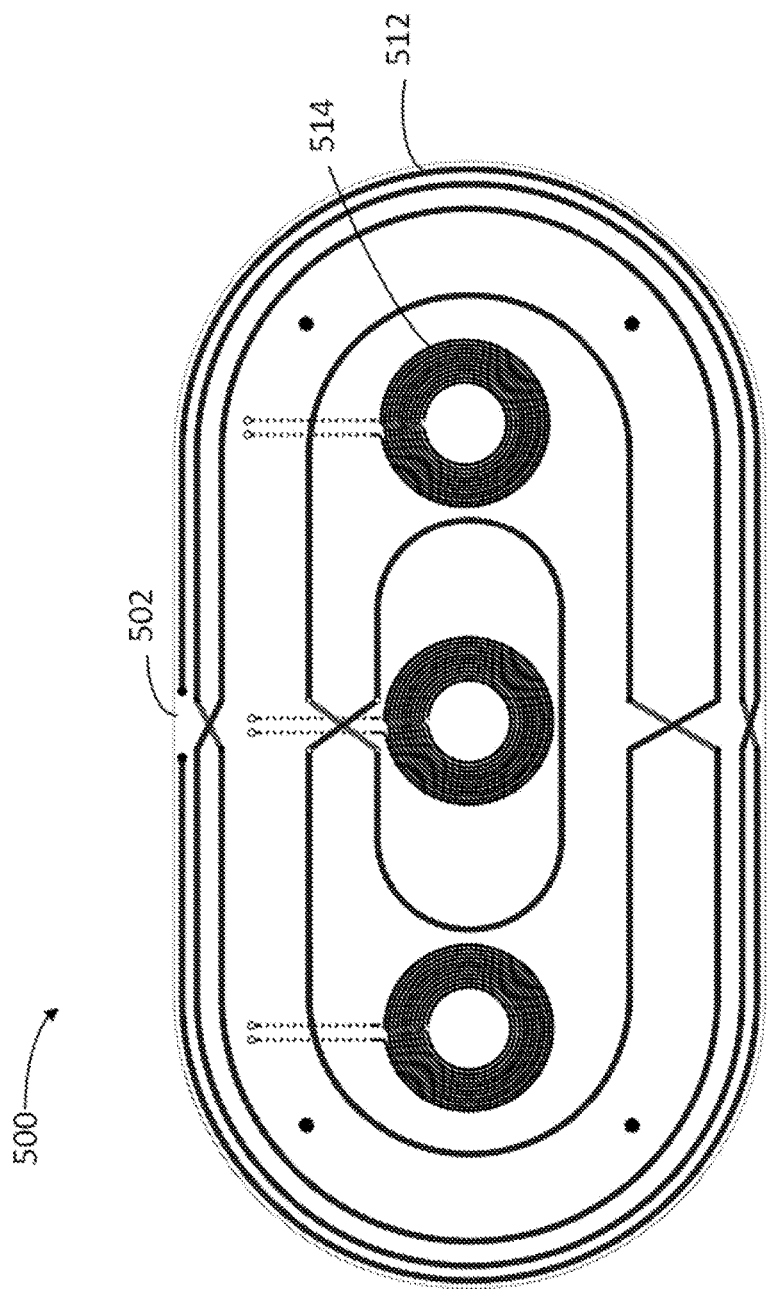
FIG. 5 is a top view of a layout of multi-mode transmit coils of the PTU of FIG. 2, according to some embodiments.

Without the filter circuits 404 of the transmit coil circuits 213 described above, the physical arrangement of the transmit coil circuits 213 of the PTU may increase interference and/or cross-coupling between the transmit coil circuits 213. For example, FIG. 5 is a top view of a layout 500 of multi-mode transmit coils of the PTU 212 of FIG. 2, according to some embodiments. The layout 500 shows one or more mode A transmit coils 512, for example the coil circuit 408a of FIG. 4 or the transmit coils of the mode A coil and power amplifier circuit 246a of FIG. 2, on a first geometric, planar layer (for example, in a same plane as the paper of FIG. 5). The first layer may comprise a first layer of a PCB 502 on which the layout 500 of multi-mode transmit coils is disposed. The one or more mode A transmit coils 512 are wound substantially about, on, and/or along the first layer. In some embodiments, the one or more mode A transmit coils 512 are wound substantially along a perimeter of the first layer. The one or more mode A transmit coils 512 may include one or more turns (for example, a first turn disposed substantially inside a perimeter of a second turn). In some embodiments, the one or more mode A transmit coils 512 comprise one or more traces or similar structures on the first layer of the PCB 502. In some embodiments, the one or more mode A transmit coils 512 are attached to the PCB 502 via an insulating adhesive or other insulating material (for example, encased in plastic, and so forth). The layout 500 also shows a plurality of mode B transmit coils 514, for example, the coil circuit 408*b* of FIG. 4 or the mode B transmit coil and power amplifier circuit 246*b*, on a second layer that is substantially parallel with the first layer. In some embodiments, as shown, the second layer, which comprises a second geometric, planar layer of the PCB 502, is placed on top of the first layer. In some embodiments, the one or more mode A transmit coils 512 and the mode B transmit coils 514 are disposed on the same layer of the PCB 502 (i.e., one of the first and second layers of the PCB 502). When the one or more mode A transmit coils 512 and the mode B transmit coils 514 are disposed on different layers of the PCB 502, paths or openings exist in one or more of the layers (and, for example, in the plastic casing) of the PCB 502 to allow feeds to pass through and to the mode A and mode B transmit coils 512 and 514, respectively. In some embodiments, the one or more mode A transmit coils 512 are disposed on the second layer of the PCB 502 while the mode B transmit coils 514 are disposed on the first layer of the PCB 502. In some embodiments, one or more of the mode A transmit coils 512 overlap with one or more of the mode B transmit coils 514 (not shown in this figure). For example, conductive portions of the mode A transmit coil 512 may overlap conductive portions of the mode B transmit coil 512 when the mode A transmit coil 512 and the mode B transmit coil 514 are substantially in the same layer (for example, the first layer) or are in different layers. In some embodiments, the mode A transmit coil 512 may generally cover a first area that overlaps with at least a portion of a second area covered by the mode B transmit coil 514 when the mode A transmit coil 512 and the mode B transmit coil 514 are substantially in the same layer or different layers. In some embodiments, the mode A transmit coil 512 covers a first geometric area and the mode B transmit coil 514 covers a second geometric area that does not overlap with the first geometric area is adjacent to the first geometric area. In any of these arrangements, the mode A transmit coil 512 and the mode B transmit coil are determined to be collocated. Thus, one of the mode B transmit coils 512 may or may not overlap with at least a portion of one of the mode A transmit coils in the same layer or different layers.

In some embodiments, although the layout 500 is described above as representing transmit coils 512 and 514 of the PTU 212, the layout 500 may similarly apply to receive coils of the PRU 214. For example, the layout 500 comprises two or more sets of copper wire, coil traces or other patterns (for example, for RF antennas) form antennas and/or coils that are suitable for transmitting and/or receiving wireless power via the wireless field and/or the wireless signal. These sets of antennas and/or coils may be configured as an array in one or more of a 2D or 3D layout. In some embodiments, one of the one or more sets of antennas and/or coils is optimized for one wireless power transmission frequency, such as 6.78 MHz, while another set of antennas and/or coils is optimized for another frequency of wireless power transmission, such as 95 kHz.

In some embodiments, the antennas and/or coils of one set may overlap with another set in order to minimize thickness of the layout 500. For example, when disposed on the PCB, the layout 500 comprise overlapping antenna and/or coil sets or layers. In some embodiments, one or more of the antenna and/or coil sets may pass through other antenna and/or coil sets on the same plane and reconnect through another layer of antenna and/or coil sets by vias or similar structures.

Figure 6:
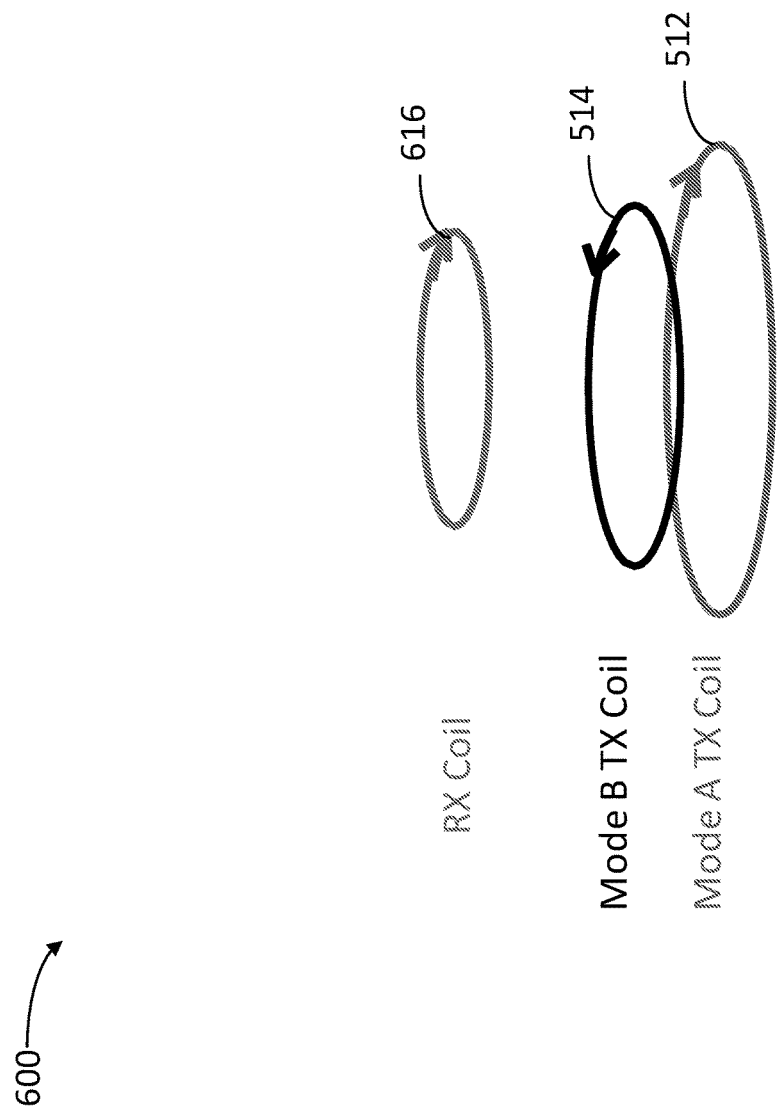
FIG. 6 is a perspective view of the layout of multi-mode transmit coils of FIG. 5 relative to a receive coil of one of the PRUs in the multi-mode system of FIG. 2, according to some embodiments.

FIG. 6 is a perspective view of the layout 600 of multi-mode transmit coils 512 and 514 of FIG. 5 relative to a receive coil 616 of one of the PRUs 214 in the multi-mode system 200 of FIG. 2, according to some embodiments. The layout 600 shows a general stacked arrangement of a mode A transmit coil 512 located below (for example, disposed on the first layer of the PCB 502) a mode B transmit coil 514 (for example, disposed on the second layer of the PCB 502) of the PTU 212 relative to a receive coil 616 of the PRU 214*a* (for example, a receive coil 46, as described above). The layout 600 also shows general respective current flows (for example, current flow directions in the respective coils) for the mode A transmit coil 512 and the mode B transmit coil 514 and an induced current flow for the receive coil 516. For example, as shown in the layout 600, the mode A transmit coil 512 has a current flow in a clockwise direction as viewed from above the layout 600. The mode B transmit coil 514 has a current flow in a counter-clockwise direction as viewed from above the layout 600.

The receive coil 616 is shown at a distance above the transmit coils 512 and 514. In some embodiments, the receive coil 616 is configured to receive power via one or more of the mode A transmit coil 512 and the mode B transmit coil 514. In some embodiments, the receive coil 512 has a current flow direction that is in the clockwise direction as viewed from above the layout 600. The direction of current flow in the receive coil 616 may be dependent upon which of the mode A transmit coil 512 and the mode B transmit coil 514 is transmitting power to the receive coil 616.

In some embodiments, as described above, when one of the mode A transmit coil 512 and the mode B transmit coil 514 is activated to transfer power to the receive coil 512 and the mode A transmit coil 512 and the mode B transmit coil 514 are not coupled to the frequency select filter circuits 404 described above, an undesired current is induced in the other of the mode A transmit coil 512 and the mode B transmit coil 514. For example, without the frequency select filter circuits 404, the non-transmitting coil of the mode A transmit coil 512 and the mode B transmit coil 514 does not operate as an open circuit (for example, not in an open circuit state) and thus is a load on the transmitting coil, creating power transfer inefficiencies because some power from the field may be diverted to the non-transmitting transmit coil. One or more switches may be used to open the other of the mode A transmit coil A 512 and the mode B transmit coil 514 in combination with the detecting of what frequency is to be used to transmit wireless power to the receive coil 516, as described above.

Figure 7:
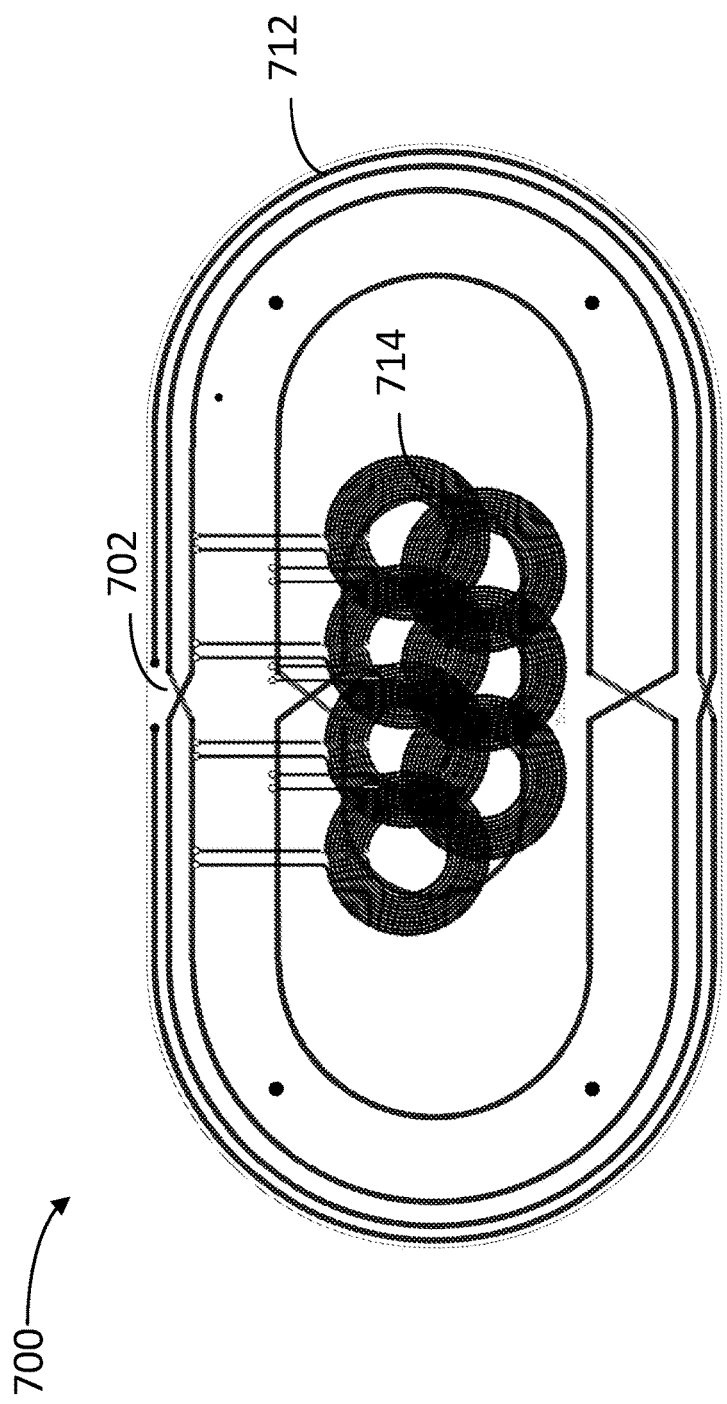
FIG. 7 is a top view of a layout of multi-mode transmit coils of the PTU of FIG. 2 having overlapping antennas, according to some embodiments.

As noted above, in some embodiments, the frequency filters of the transmit coil circuits 213 described herein suppress interference between a PTU 212 having overlapping coils, as shown in FIG. 7. FIG. 7 is a top view of a layout of multi-mode transmit coils 712 and 714 of the PTU 212 of FIG. 2 having overlapping antennas, according to some embodiments. The layout 700 shows one or more mode A transmit coils 712, for example the coil circuit 408*a* of FIG. 4 or the transmit coils of the mode A coil and power amplifier circuit 246*a* of FIG. 2, on a first geometric, planar layer (for example, in a same plane as the paper of FIG. 7). The first layer may comprise a first layer of the PCB 702 on which the layout 700 of multi-mode transmit coils is disposed. The one or more mode A transmit coils 712 are wound substantially about, around, on, and/or along the first layer. In some embodiments, the one or more mode A transmit coils 712 are wound substantially along a perimeter of the first layer. The one or more mode A transmit coils 712 may include one or more turns (for example, a first turn disposed substantially inside a perimeter of a second turn). In some embodiments, the one or more mode A transmit coils 712 comprise one or more traces or similar structures on the first layer of the PCB 702. In some embodiments, the one or more mode A transmit coils 712 are attached to the PCB 702 via an insulating adhesive or other insulating material (for example, encased in plastic, and so forth). The layout 700 also shows a plurality of mode B transmit coils 714, for example, the coil circuit 408b of FIG. 4 or the mode B transmit coil and power amplifier circuit 246b, on a second layer that is substantially parallel with the first layer. In some embodiments, as shown, the second layer, which comprises a second geometric, planar layer of the PCB 702, is placed on top of the first layer. In some embodiments, the one or more mode A transmit coils 712 and the mode B transmit coils 714 are disposed on the same layer of the PCB 702 (i.e., one of the first and second layers of the PCB 702). When the one or more mode A transmit coils 712 and the mode B transmit coils 714 are disposed on different layers of the PCB 702, paths or openings exist in one or more of the layers (and, for example, in the plastic casing) of the PCB 702 to allow feeds to pass through and to the mode A and mode B transmit coils 712 and 714, respectively.

In some embodiments, although the layout 700 is described herein as representing transmit coils 712 and 714 of the PTU 212, the layout 700 may similarly apply to receive coils of the PRU 214. For example, the layout 700 comprises two or more sets of copper wire, coil traces or other patterns (for example, for RF antennas) form antennas and/or coils that are suitable for transmitting and/or receiving wireless power via the wireless field and/or the wireless signal. These sets of antennas and/or coils may be configured as an array in one or more of a 2D or 3D layout. In some embodiments, one of the one or more sets of antennas and/or coils is optimized for one wireless power transmission frequency, such as 6.78 MHz, while another set of antennas and/or coils is optimized for another frequency of wireless power transmission, such as 115 kHz.

As noted above, while the transmit coils 712 may overlap with the transmit coils 714, individual transmit coils 712 and/or 714 may overlap with each other. For example, as shown in FIG. 7, seven mode B transmit coils 714 are shown in an arrayed layout or arrangement. The arrangement of the seven mode B transmit coils 714 includes four mode B transmit coils 714 arranged substantially in a first line and three mode B transmit coils arranged substantially in a line substantially parallel with the line of four mode B transmit coils 714. As shown, consecutive mode B transmit coils 714 in each line overlap with each other, at least in part. The second line of three mode B transmit coils 714 overlaps with the first line of four mode B transmit coils 714. As such, each mode B transmit coil 714 overlaps with at least two other mode B transmit coils 714. For example, the four mode B transmit coils 714 on the ends of the two lines each overlap two other mode B transmit coils 714. The three mode B transmit coils 714 not at the ends of the two lines each overlap four other mode B transmit coils 714. In some embodiments, the seven mode B transmit coils 714 are disposed substantially in a single layer (for example, the second layer of the PCB 702). As also shown in FIG. 7, each of the seven mode B transmit coils 714 overlaps with at least a portion of the mode A transmit coil 712.

In some embodiments, the transmit coils of either or both modes may overlap with each order to minimize an area of the layout 700 but possibly increasing a thickness of the layout 700. For example, when disposed on the PCB 702, the layout 700 comprises overlapping antenna and/or coil sets or layers, as described above, which means the same number of transmit coils 712 and 714 requires less area for the PCB 702 to include a same quantity of transmit coils. In some embodiments, one of the coil sets may pass through other coil sets on the same plane and reconnect through another layer of coil sets by vias or similar structures.

In embodiments of the PTU 212, the filter circuit 404 can also further suppress the interference between each overlapping mode B transmit coil 714. For example, in the arrayed and/or overlapping system of mode B transmit coils 714 described above, the filter circuits 404 for each of the mode B transmit coils 714 may operate at a different frequency (for example, allow a particular frequency band to pass). In some embodiments, each of the mode A and mode B transmit coils 712 and 714, respectively, are tuned or operate at a particular frequency. Similarly, each mode A and mode B transmit coil 712 and 714, respectively, may be coupled to a corresponding filter circuit that is tuned to the particular frequency. The frequency at which the mode A or mode B transmit coil 712 and 714, respectively, transmits may determine its position in the array of transmit coils. For example, if one mode B transmit coil 714 is tuned to 120 kHz and another is tuned to 175 kHz, these frequency values may determine the positions of the respective mode B transmit coils 714 in the arrangement of the mode B transmit coils 714. For example, mode B transmit coils 714 with similar transmit frequencies may be placed more closely together in the arrangement of the mode B transmit coils as compared to those with more different transmit frequencies, or the opposite may be true. In some embodiments, different operating frequencies for the filter circuits 404, and thus the transmit coils 712 and 714, provide different initial frequencies to assist with determining a placement of the receiving coil 616 during a frequency sweeping process to help determine a position of the receiving coil 616 among the array of transmit coils 712 and/or 714. Accordingly, each mode B transmit coil 714 can be individually activated to reduce power consumption and improve thermal management of the PTU 212. The arrangement and/or layout of the PTU 212 shown in FIG. 7 is not limited to a particular number of transmit coils 712 or 714 or coil arrays.

Additional Considerations

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the implementations of the invention.

The various illustrative blocks, modules, and circuits described in connection with the implementations disclosed herein, including the controller circuit, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the disclosure and the scope of the appended claims.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more". The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f) unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A power transfer system for providing charging power to a power receiver, the system comprising:
   a hardware controller circuit configured to determine a first frequency for providing power from a first power transmitter to the power receiver via a first wireless field; and
   a first filter circuit operationally coupled to the hardware controller circuit, and having a first frequency bandpass configured to pass a first driver signal for generating the first wireless field at the first frequency;
   a second filter circuit operationally coupled to the hardware controller circuit, and having a second frequency bandpass configured to pass a second driver signal for generating a second wireless field at a second frequency that is different from the first frequency;
   a first coil circuit operationally coupled to the first filter circuit and configured to receive the first driver signal from the first filter circuit and generate the first wireless field;
   a second coil circuit operationally coupled to the second filter circuit and configured to receive the second driver signal from the second filter circuit and generate the second wireless field;
   a first matching circuit coupled between the first filter circuit and the first coil circuit and configured to match impedance of the first coil circuit to impedance observed at the first filter circuit; and
   a second matching circuit coupled between the second filter circuit and the second coil circuit and configured to match impedance of the second coil circuit to impedance observed at the second filter circuit.

2. The power transfer system of claim 1, wherein the second frequency bandpass is selected to cause the second filter circuit to be in an open circuit state that prevents the second filter circuit from drawing power from the first wireless field at the first frequency.

3. The power transfer system of claim 1, wherein the first frequency bandpass is selected to cause the first filter circuit to be in an open circuit state that prevents the first filter circuit from drawing power from the second wireless field at the second frequency.

4. The power transfer system of claim 1, wherein each of the first and second wireless fields comprises a magnetic field and/or a radio frequency (RF) field.

5. The power transfer system of claim 1, wherein the first frequency bandpass and second frequency bandpass do not overlap in frequency range.

6. The power transfer system of claim 1, further comprising a driver circuit configured to generate and provide the first driver signal and/or second driver signal to the first filter circuit and second filter circuit, respectively.

7. The power transfer system of claim 1, wherein the first coil circuit and second coil circuit overlap a common area in the same or different geometric plane.

8. The power transfer system of claim 1, wherein the first coil circuit covers a first geometric area and the second circuit coil covers a second geometric area that overlaps with and is greater than the first geometric area.

9. The power transfer system of claim 1, further comprising a driver circuit configured to generate and provide the first driver signal to the first filter circuit and concurrently inhibit generating or providing the second driver signal to the second filter circuit.

10. The power transfer system of claim 1, further comprising a driver circuit configured to generate and provide the second driver signal to the second filter circuit and concurrently generates and provides the second driver signal to the second filter circuit.

11. The power transfer system of claim 9, further comprising a first coil circuit configured to receive the first driver signal from the first filter circuit and generate the first wireless field that transfers power at a level sufficient to charge or power the power receiver.

12. A method of providing charging power to a power receiver, the method comprising:
determining a first frequency for providing power from a first power transmitter to the power receiver via a first wireless field;
passing a first signal having the first frequency via a first filter circuit, the first signal for generating the first wireless field at the first frequency;
passing a second signal having a second frequency different from the first frequency via a second filter circuit, the second signal for generating a second wireless field at the second frequency;
receiving the first signal from the first filter circuit;
generating the first wireless field based on the first signal via a first coil circuit;
receiving the second signal from the second filter circuit;
generating the second wireless field based on the second signal via a second coil circuit;
matching impedance of the first coil circuit to impedance observed at the first filter circuit; and
matching impedance of the second coil circuit to impedance observed at the second filter circuit.

13. The method of claim 12, further comprising generating and providing the first signal to the first filter circuit and concurrently inhibiting generating or providing the second signal to the second filter circuit.

14. The method of claim 12, further comprising generating and providing the second driver signal to the second filter circuit and concurrently generating and providing the second driver circuit to the second filter circuit.

15. A power transfer system for providing charging power to a power receiver, the system comprising:
means for determining a first frequency for providing power from a first power transmitter to the power receiver via a first wireless field;
means for passing a first signal having the first frequency, the first signal for generating the first wireless field at the first frequency;
means for passing a second signal having a second frequency different from the first frequency, the second signal for generating a second wireless field at the second frequency;
means for receiving the first signal from the means for passing the first signal;
means for generating the first wireless field based on the first signal;
means for receiving the second signal from the means for passing the second signal;
means for generating the second wireless field based on the second signal;
means for matching impedance of the means for generating the first wireless field to impedance observed at the means for passing the first signal; and
means for matching impedance of the means for generating the second wireless field to impedance observed at the means for passing the second signal.

16. The system of claim 15, wherein the means for determining comprises a hardware controller circuit, wherein the means for passing a first signal comprises a first filter circuit operationally coupled to the hardware controller circuit, and wherein the means for passing a second signal comprises a second filter circuit operationally coupled to the hardware controller circuit.

\* \* \* \* \*